United States Patent [19]

Zama et al.

[11] Patent Number: 5,047,885
[45] Date of Patent: Sep. 10, 1991

[54] MAGNETIC HEAD FORMED OF THIN METAL FILM INCLUDING A CHEVRON SHAPE

[75] Inventors: Hideo Zama, Katsuta; Hitoshi Idegami, Ibaraki; Yosio Manabe, Hitachi; Kenkichi Inada, Katsuta, all of Japan

[73] Assignee: Hitachi, Ltd., Tokyo, Japan

[21] Appl. No.: 269,608

[22] Filed: Nov. 10, 1988

[30] Foreign Application Priority Data

Nov. 13, 1987 [JP] Japan ................... 62-285605

[51] Int. Cl.⁵ ............................................. G11B 5/147
[52] U.S. Cl. .................................... 360/126; 360/122
[58] Field of Search ............... 360/126, 125, 127, 122

[56] References Cited

U.S. PATENT DOCUMENTS

| 4,701,819 | 10/1987 | Inogoya et al. ............ 360/122 |
| 4,774,616 | 9/1988 | Kunasaka et al. ........... 360/126 |
| 4,803,338 | 2/1989 | Kunasaka et al. ........... 360/122 |

FOREIGN PATENT DOCUMENTS

| 0045716 | 3/1986 | Japan . |
| 0046605 | 2/1988 | Japan ................... 360/126 |

Primary Examiner—David J. Severin
Attorney, Agent, or Firm—Antonelli, Terry, Stout & Kraus

[57] ABSTRACT

Disclosed is a magnetic head formed of a thin metal film in which a metal magnetic film in the form of a chevron is formed on a substrate, and two half cores in each of which the apex portion of the chevron-shaped metal magnetic film is flattened are integrated in such a manner as to face each other with a gap member placed therebetween, the magnetic head comprising a desired track width not more twice thicknesses $d_1$, $d_2$ of the metal magnetic film on both sides of the apex portion, and the following formula is met:

$$0.74 \leq d_2/d_1 \leq 1.35.$$

6 Claims, 2 Drawing Sheets

5,047,885

MAGNETIC HEAD FORMED OF THIN METAL FILM INCLUDING A CHEVRON SHAPE

BACKGROUND OF THE INVENTION

The present invention relates to a magnetic head formed of a thin metal film suitable for use in a VTR or the like, and more particularly to a magnetic head made of a thin metal film in which a metal magnetic film is formed on a substrate in the form of a chevron.

A known thin metal film magnetic head of this type is arranged such that a metal magnetic film is formed on a substrate in the form of a chevron, an apex portion of this chevron-shaped metal magnetic film is flattened to constitute a half core, and such two half cores are integrated with a gap member such as glass placed therebetween in such a manner that the apices of the half cores face each other (e.g. Japanese Utility Model Unexamined Publication No. 61-45716). The gap member placed between these apices constitutes a head gap.

In such a thin metal film magnetic head, a ferrite material is used as a substrate, and an amorphous magnetic material is used as the metal magnetic film. Since magnetic flux is concentrated on the head gap by this amorphous magnetic material, superior performance can be obtained. In addition, since the boundary between the metal magnetic film and the substrate is inclined with respect to the gap, this gap does not constitute a pseudo-gap.

However, with the above-described prior art, there have been drawbacks in that, even if magnetic heads having the same track width are formed by the same apparatus, variations occur in the performance, and that, if the track width varies, the performance also varies. For instance, the greater the track width, the greater the reproduction output can be obtained, and a reproduction output commensurate with the track width should naturally be obtained (i.e., if the track width is doubled, the reproduction output is also doubled). Actually, however, it has been impossible to obtain a reproduction output of a magnitude commensurate with track width.

SUMMARY OF THE INVENTION

Accordingly, an object of the present invention is to provide a magnetic head formed of a thin metal film which is free of variations in performance and which is superior in performance, thereby overcoming the above-described drawbacks of the prior art.

To this end, in accordance with the present invention, there is provided a magnetic head formed of a thin metal film in which a metal magnetic film in the form of a chevron is formed on a substrate, and two half cores, in each of which the apex portion of the chevron-shaped metal magnetic film is flattened, are integrated in such a manner as to face each other with a gap member placed therebetween, the magnetic head comprising a desired track width which is not more than twice thickness $d_1$, $d_2$ of the metal magnetic film provided on both sides of the apex portion, and the following formula is met:

$$0.74 \leq d_2/d_1 \leq 1.35.$$

In accordance with the present invention, variations in performance with respect to track width are reduced and stable performance can be obtained. In addition, with respect to a given track width, performance commensurate with that track width can be obtained, and it is possible to provide a magnetic head formed of a thin metal film which possesses an outstanding function by overcoming the above-described drawbacks of the prior art.

The above and other objects, features and advantages of the present invention will become more apparent from the following detailed description of the invention when read in conjunction with the accompanying drawings.

DESCRIPTION OF THE PREFERRED EMBODIMENT

In the above-described prior art, no consideration is given to the thickness of a metal magnetic film. However, this film thickness exerts a substantial effect on the performance of the head. According to measurements made by the present inventor, the greater the thickness of the metal magnetic film with respect to the track width, the higher the performance, and the closer to 1 is a ratio between film thicknesses of those portions of the metal magnetic film that are located on both sides of the chevron-shaped apex portions, the higher the performance and the less the variations.

The present invention has been devised in light of this aspect, and by setting the track width to not more than twice the thickness of the metal magnetic film, high performance commensurate with the track width can be obtained, while, by setting the ratio between thicknesses $d_1$, $d_2$ of the metal magnetic films provided on both sides of the chevron-shaped flat apex as described above, the variations in the performance are restrained, and high performance can be maintained. In addition, the aforementioned upper and lower limits with respect to these thicknesses $d_1$, $d_2$ are in reciprocal relationships with each other.

Referring now to the accompanying drawings, a description will be given of an embodiment of the present invention.

Figure 1:
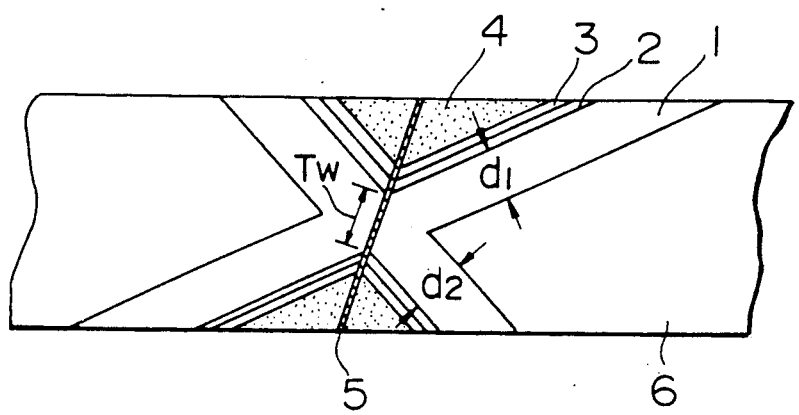
FIG. 1 is a top plan view illustrating a magnetic head formed of a thin metal film in accordance with an embodiment of the present invention.

FIG. 1 is a top plan view of a magnetic head formed of a thin metal film in accordance with an embodiment of the present invention, which comprises the following components: a metal magnetic film 1, an $SiO_2$ film 2, a Cr film 3, glass 4, a gap member 5, and a substrate 6.

In the drawing, with a plane including the gap member 5 serving as a boundary, the right- and left-hand side portions respectively constitute half cores, and they are integrated via the gap member 5. Since the left- and right-hand side portions have identical arrangements, a description will be given of the right-hand side half core. The metal magnetic film 1 is formed on the substrate 6 constituting a chevron shape with a fixed gradient. The $SiO_2$ film 2 and the Cr film 3 are laminated on the metal magnetic film 1. The glass 4 is provided on the Cr film 3. Accordingly, the laminate comprising the $SiO_2$ film 2 and the Cr film 3 on the metal magnetic film 1 is also shaped in the form of a chevron, but the apex thereof is flattened.

Two such half cores are integrated with the gap member 5 placed therebetween. The flat apices of the metal magnetic films 1 of the half cores are arranged to face each other with the gap member 5 placed therebetween, and this gap member 5 between these apices constitutes a head gap.

If it is assumed that the track width of the head gap is Tw and the film thicknesses on both sides of the apex portion of the metal magnetic film 1 are respectively $d_1$ and $d_2$, the track width Tw is set to be not more than twice the thicknesses $d_1$, $d_2$ of the metal magnetic film 1, preferably 0.3-fold or above and 1.2-fold or less, and a setting is made to meet the following formula:

$$0.74 \leq d_2/d_1 \leq 1.35$$

It should be noted that the metal magnetic film 1 may be formed of a single layer or a multilayer, while the substrate 6 may be a ferrite substrate or a nonmagnetic substrate.

Figure 2:
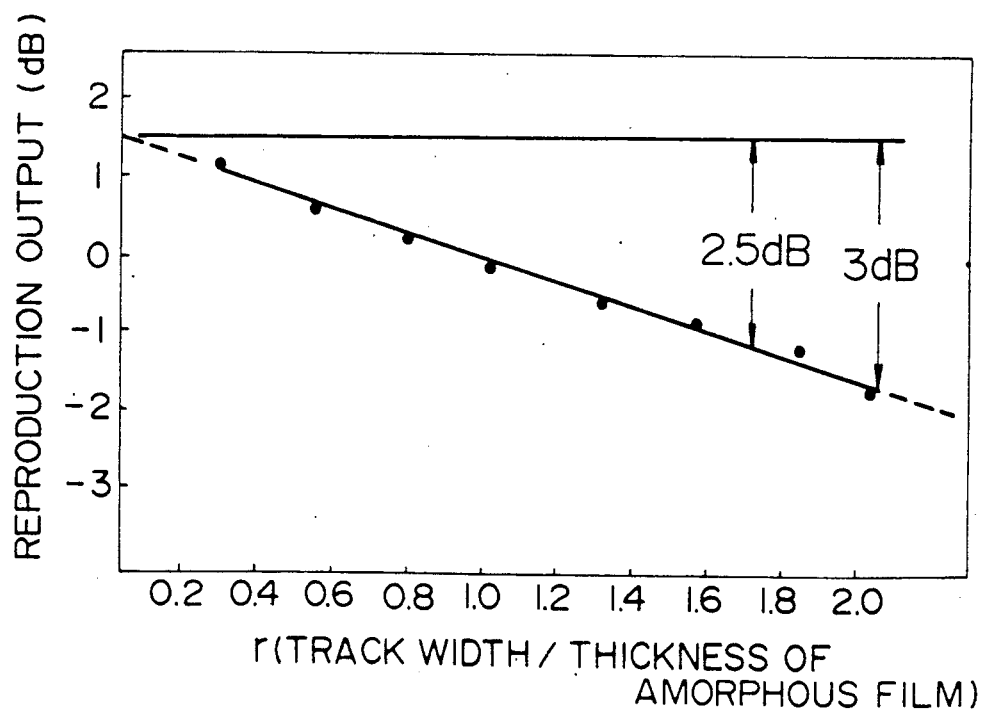
FIG. 2 is a graph illustrating the results of measurement of the reproduction output with respect to a ratio between the track width and the metal magnetic film thickness.

FIG. 2 shows experimentally determined relationships between the reproducing output and the ratio $\gamma$ of the track width to the thickness of the metal magnetic film 1 (the track width/the metal film thickness) when single crystal ferrite is used as the substrate 6 and a Co-Nb-Zr amorphous magnetic material is used as the metal magnetic film 1. The thickness of the metal magnetic film in this ratio $\gamma$ is an average thickness d [i.e. $(d_1 + d_2)/2$] of the thicknesses $d_1$, $d_2$ shown in FIG. 1. In addition, the reproduction output when the track width Tw and the thickness d of the metal magnetic film 1 are equal ($\gamma = 1$) is set at 0 dB. Furthermore, in FIG. 2, when $\gamma \neq 1$, an estimated reproduction output is calculated by changing the actual reproduction output obtained in the case of this $\gamma$ (which is not equal to 1) into a provisional reproduction output expected in the case of $\gamma$ equal to 1. The ratio of the reproduction output obtained actually to this estimated reproduction output is expressed and plotted as dB. For instance, if the thickness d of the metal magnetic film 1 is set to be 20 $\mu$m, and if the reproduction output when the Track width Tw is 20 $\mu$m which is equal thereto is set to be 100, a reproduction output can be estimated to be 50 when the thickness of the metal magnetic film 1 is also 20 $\mu$m with the track width Tw being 10 $\mu$m ($\gamma = 0.5$). If an actual reproduction output obtained by actual measurement is 55, the ratio between these reproduction outputs, 55/50, corresponds to about +0.8 dB, and in FIG. 2, the reproduction output when $\gamma = 0.5$ is plotted as 0.8 dB.

Thus, if the reproduction output was determined with respect to various values of $\gamma$, and was plotted as shown in FIG. 2, it was found that almost all the respective points are on the same straight line, and that the reproduction output decreases in proportion to $\gamma$. In this case, the reproduction output is 0 dB when $\gamma = 1$, about $-1.5$ dB when $\gamma = 2$, and about $-0.7$ dB when $\gamma = 1.5$. From these facts, the relationships between $\gamma$ and the reproduction output on the basis of the straight line in FIG. 2 can be expressed as follows:

$$1.5(1-\gamma) \text{ (dB)} \qquad (1)$$

Since $\gamma$ is the ratio of the track width Tw to the thickness d of the metal magnetic film 1, it can be understood from the above-described relation (1) and FIG. 2 that the reproduction output increases in proportion to the thickness d of the metal magnetic film 1 and decreases in proportion to the track width Tw. Accordingly, if the track width Tw is made large, a large reproduction output commensurate with this track width Tw cannot be obtained unless the thickness d of the metal magnetic film 1 is increased by an amount commensurate to the increment of the track width.

If the variations of the reproduction output are within 3 dB, no particularly serious problem occurs with respect to the performance of the head and mass production. In this case, since this range of 3 dB should be set in a region where the reproduction output is large, the reproduction output is maximum when $\gamma = 0$, which maximum reproduction output in this case is about $+1.5$ dB from the aforementioned formula (1), and the range of 3 dB should be set on the basis of this reproduction output. From the aforementioned formula (1), this range of 3 dB corresponds to such values as $0 < \gamma \leq 2$. Accordingly, the track width Tw may be set to be not more than twice the thickness d of the metal magnetic film 1.

More preferably, however, the reproduction output should be within about $-1.8$ dB of the possible maximum value. The upper limit of $\gamma$ in this range can be determined from the aforementioned formula (1) as $\gamma = 1.2$. In addition, the greater the thickness d of the metal magnetic film 1 with respect to the track width Tw, the more the reproduction output increases. However, the reproduction output increases by about 1.5 dB at best in comparison with the case of $\gamma = 1$. Moreover, if this film thickness d is made large, an increased operating time is consumed by that increment, and the metal magnetic film 1 is apt to be exfoliated from the substrate 6, so that the enlargement of the film thickness d is not necessarily advantageous. For this reason, the lower limit of $\gamma$ should preferably be set to be about 0.3 (i.e., the thickness d of the metal magnetic film 1 should be set to about 3-fold the track width Tw. Accordingly, the track width Tw is preferably set to be not less than 0.3-fold but not more than 1.2-fold the thickness d of the metal magnetic film 1. Thus, a reproduction output commensurate with the track width Tw can be obtained.

Figure 3:
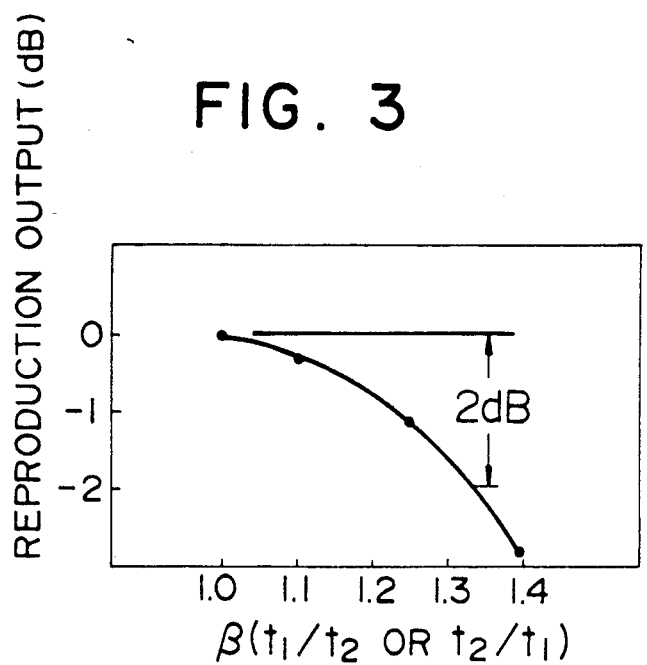
FIG. 3 is a graph illustrating the results of measurement of the reproduction output with respect to the thickness ratio of the metal magnetic film.

FIG. 3 shows experimentally determined relationships between the reproduction output and a ratio $\beta$ between thicknesses $d_1$, $d_2$ of portions on both sides of the chevron-shaped apex in the metal magnetic film 1.

As is apparent from FIG. 3, the reproduction output decreases as $\beta$ increases from 1.0, and, if the reproduction output when $\beta = 1.0$ is assumed to be 0 dB, the reproduction output decreases by 1 dB or more when $\beta = 1.2$, and decreases by about 2 dB when $\beta = 1.35$. The occurrence of the relationships of the reproduction output with respect to this $\beta$ are conceivably attributable to magnetic anisotropy occurring during the sputtering of the metal magnetic film 1. At any rate, if the reproduction output varies to an extent greater than 2 dB with respect to the variation in $\beta$, the variations in an actual reproduction output will be excessively large (possibly larger than 5 dB) in light of allowable variations of the reproduction output with respect to $\gamma$ shown in FIG. 2, with the result that a problem occurs in mass production. Accordingly, $\beta$ should preferably be set to be $\beta \leq 1.35$.

In a case of $\beta = d_1/d_2$ and in another case of $\beta = d_2/d_1$, the variations of the reproduction output when $\beta \geq 1$ are equal in both cases, as shown in FIG. 3. In addition, the variation in the reproduction output when $\beta \geq 1$ in a case where $\beta = d_1/d_2$ is identical with the variation of the reproduction output when $\beta \leq 1$ in another case where $\beta = d_2/d_1$. Conversely, the variation in the reproduction output when $\beta \geq 1$ in a case where $\beta = d_2/d_1$ is identical with the variation of the reproduction output when $\beta \leq 1$ in another case where $\beta = d_1/d_2$. From these facts, the characteristics shown in FIG. 3 become symmetrical with respect to $\beta = 1.0$. Accordingly, in order to restrict the variations in the reproduction output with respect to $\beta$ to within 2 dB, the formula $0.74 \leq \beta \leq 1.35$ must be met (where 0.74 is a symmetrical value with $\beta = 1.35$ with respect to $\beta = 1$ in FIG. 3, so that $0.74 = 1/1.35$.

Figure 4:
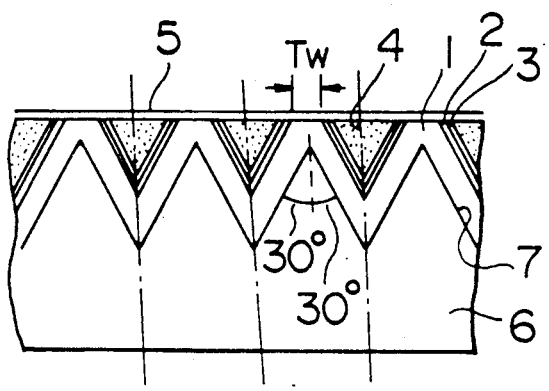
FIG. 4 is a diagram illustrating a method of production in accordance with the embodiment shown in FIG. 1.

Referring now to FIG. 4, a specific description will be given of examples of a method of production in accordance with the embodiment shown in FIG. 1 as well as thicknesses of various films.

First, a multiplicity of chevron-shaped grooves 7 having a fixed gradient of 30° were formed on the surface of the single crystal ferrite substrate 6 such as to be parallel to each other. The Co-Nb-Zr amorphous magnetic material was sputtered onto the surfaces of these chevron-shaped grooves 7 by using an RF sputtering apparatus, thereby forming the metal magnetic film 1 having an approx. 22 μm thickness. After the SiO$_2$ film 2 and, further, the Cr film 3 were laminated on the surface of the metal magnetic film 1, the glass 4 was filled in the remaining portions of the chevron-shaped grooves 7, and the surface was ground and lapped and flat apex portions were formed in such a manner that the track width Tw becomes 25 μm. After the grinding and lapping, the SiO$_2$ film having an approx. 0.11 μm was sputtered on the surface. This SiO$_2$ film serves as the gap member 5. Two half core blocks of the substrate 6 on which each film had thus been formed were arranged in such a manner that the flat apex portions of the metal magnetic film 1 opposed to each other, and were then bonded to each other by heating. The pair of core blocks thus formed were cut along the dot-chain line, thereby obtaining the magnetic head formed of a thin metal film shown in FIG. 1.

In the magnetic head thus formed of a thin metal film, the thicknesses $d_1$, $d_2$ on both sides of each of the apices of the metal magnetic film 1 were respectively 22 μm and 20 μm. On the basis of this fact, since $d = 21$ μm, we have $$\gamma\left(=\frac{Tw}{d}\right) = 1.2 \text{ and}$$

$$\beta\left(=\frac{d_1}{d_2}\right) = 1.1.$$

In addition, when the recording and reproduction of 5 MHz signals were effected by running a metal powdered tape at a rate of 3.75 m/sec by setting the number of turns of the coil for this magnetic head formed of a thin metal film to be 16 and by setting the inductance to be 1.0 μH, a high reproduction output of 0.19 mV$_{p\text{-}p}$ was obtained.

As another specific example, four amorphous magnetic films each having a 11 μm thickness and formed of the same material as the above-described one were laminated to constitute the metal magnetic film 1, and the track width Tw was set to be 57 682 m. The thicknesses $d_1$, $d_2$ of the metal magnetic film 1 were respectively 44 μm and 39 μm. Accordingly, since $d = 41.5$ μm, we have $$\gamma = 1.37, \text{ and } \beta = 1.13.$$

When the recording and reproduction of 7 MHz signals were effected by running a metal powdered tape at a rate of 5.6 m/sec by setting the number of turns of the coil for this magnetic head formed of a thin metal film to be 22 and by setting the inductance to be 2.2 μH, a high reproduction output of 0.72 mV$_{p\text{-}p}$ was obtained.

What is claimed is:

1. A magnetic head formed of a thin metal film in which a metal magnetic film in the form of a chevron is formed on a substrate, wherein two half cores of said magnetic head are formed and in each half core the apex portion of said chevron-shaped metal magnetic film is flattened, said two half cores being integrated in such a manner as to face each other with a gap member placed therebetween, said magnetic head having a track width not greater than twice the average thickness d of thicknesses $d_1$, $d_2$, wherein $d_1$ and $d_2$ represent the thickness of said metal magnetic film provided on both sides of said apex portion, respectively, wherein $d_1$ and $d_2$ are not substantially equal to each other such that $d_2/d_1 \neq 1$ and the following formula is met:

$$0.74 \leq d_2/d_1 \leq 1.35.$$

2. A magnetic head formed of a thin metal film according to claim 1, wherein said metal magnetic film is a Co-based amorphous magnetic film.

3. A magnetic head formed of a thin metal film according to claim 1, wherein said desired track width is set to be not less that 0.3(d) and not more than 1.2(d).

4. A magnetic head formed of a thin metal film according to claim 3, wherein said metal magnetic film is a Co-based amorphous magnetic film.

5. A magnetic head formed of a thin metal film according to claim 1 or 3, wherein a ferrite material is used as said substrate.

6. A magnetic head formed of a thin metal film according to claim 5, wherein said metal magnetic film is a Co-based amorphous magnetic film.

* * * * *